United States Patent [19]

Agrawal et al.

[11] 4,318,882

[45] Mar. 9, 1982

[54] METHOD FOR PRODUCING A COLLAPSE RESISTANT POLYESTER CONTAINER FOR HOT FILL APPLICATIONS

[75] Inventors: Purushottam D. Agrawal, South Windsor, Conn.; John F. Mandell, Wayland, Mass.

[73] Assignee: Monsanto Company, St. Louis, Mo.

[21] Appl. No.: 123,100

[22] Filed: Feb. 20, 1980

[51] Int. Cl.³ ............................................. B29C 17/07
[52] U.S. Cl. ................................... 264/521; 264/520; 264/524; 264/530
[58] Field of Search ................ 264/520, 521, 523, 524, 264/525, 530; 425/524, 530

[56] References Cited

U.S. PATENT DOCUMENTS

| 3,733,309 | 5/1973 | Wyeth et al. | |
|---|---|---|---|
| 3,911,071 | 10/1975 | Naumann | 264/524 |
| 3,949,034 | 4/1976 | Uhlig | |
| 4,108,937 | 8/1978 | Martineu et al. | 264/274 X |
| 4,233,022 | 11/1980 | Brady et al. | |

FOREIGN PATENT DOCUMENTS

| 866692 | 11/1978 | Belgium. | |
|---|---|---|---|
| 53-264 | 1/1978 | Japan. | |
| 54-77671 | 6/1979 | Japan. | |
| 54-90265 | 7/1979 | Japan. | |
| 54-102372 | 8/1979 | Japan. | |
| 54-102377 | 8/1979 | Japan. | |
| 54-103477 | 8/1979 | Japan. | |
| 54-137060 | 10/1979 | Japan | 264/523 |
| 55-22957 | 2/1980 | Japan. | |
| 1523146 | 8/1978 | United Kingdom. | |
| 2009029 | 6/1979 | United Kingdom. | |

*Primary Examiner*—Jan H. Silbaugh
*Attorney, Agent, or Firm*—Michael J. Murphy

[57] ABSTRACT

A collapse resistant polyester container is provided for hot fill applications employing product fill temperatures up to about 190° F. (87.8° C.) or more. The container has at least one region which is thermoelastically deformable inwardly after the container is hot filled and sealed to offset the pressure forces which tend to collapse the container as the contents cool and create an internal vacuum. The thermoelastic region is preferably formed in a two step molding process in which the region is formed and heat set at a first position and then reformed outwardly to a second position and cooled in that position.

20 Claims, 7 Drawing Figures

METHOD FOR PRODUCING A COLLAPSE RESISTANT POLYESTER CONTAINER FOR HOT FILL APPLICATIONS

This invention relates to improved containers of thermoplastic polyester material, and more particularly to oriented polyester containers which resist vacuum-induced container collapse in hot fill applications.

Containers formed from thermoplastic materials in the shape of bottles, cans, jars and the like have found increasing application in recent years. Particular interest has been directed to containers made from biaxially oriented polyester materials such as polyethylene terephthalate (PET). These PET containers are generally made by a blow molding process in which a previously molded preform is stretched and blown in a mold cavity at the material molecular orientation temperature to form the final container shape. Containers made according to this process have found utility, for example, as bottles for soft drinks and other products which traditionally are placed in the container at low or moderate temperatures. Polyester containers produced by the conventional molding process, however, exhibit extremely high thermal distortion which makes them unsuitable for the packaging of products which require filling at elevated temperatures.

As recognized in Wyeth U.S. Pat. No. 3,733,309, Belgian Pat. No. 866,692 and British Pat. No. 1,523,146, the problems associated with thermal shrinkage can be partially alleviated by applying a post-forming heat treatment to the molded container. While it may be possible to reduce the amount of thermal shrinkage of a PET container by this heat treatment technique, the resulting container is still not suitable for commercial hot fill applications. In most packaging facilities the techniques and apparatus presently employed require that a filled container be capped and sealed immediately after the filling operation (while the contents are still hot). The contents in the sealed container and the warmed head space shrink as they cool, resulting in a partial vacuum being created inside the container. Resulting pressure differentials create a net pressure force on the outside of the container walls which can cause the container to buckle or collapse. This uncontrolled buckling is aesthetically unattractive and renders the containers commercially unacceptable. While PET containers can be stiffened, e.g., with integrally molded ribs and the like or by increasing the wall thickness, these techniques are not practical to produce a container which can resist the vacuum-induced buckling forces generated in hot fill applications.

In the case of containers made from other relatively stiff materials such as acrylonitrile polymers, the art provided containers which may be subject to internal vacuum with a base having a design which curves inward under vacuum. This purely pressured-induced movement, however, is not practical per se to prevent vacuum collapse in polyester containers because it is difficult to manufacture a base which behaves in this manner.

There is a significant market now employing glass containers for products such as foods, beverages, pharmaceuticals and the like which traditionally are placed in these containers at an elevated temperature. Polyester materials have not been used commercially for these applications because of thermal and pressure induced distortion. A container which could simultaneously avoid both thermal and pressure deformation would bring the advantages of lightweight, durable PET containers to a vast new segment of the consumer product packaging industry.

Accordingly, it is an object of the present invention to provide an improved, oriented, heat set polyester container which does not exhibit either excess thermal distortion or vacuum-induced pressure distortion upon hot filling and sealing of the container.

It is also an object of the present invention to provide a thermal and pressure distortion resistant oriented, heat set polyester container which is substantially clear throughout.

Another object of the present invention is to provide a process for forming containers having the above-described properties.

These and other objects of the present invention are accomplished by providing a collapse resistant, molecularly oriented, heat set polyester container having at least one preselected inwardly thermoelastically deformable region for at least partially relieving negative pressure tending to collapse the container when hot filled, sealed and the contents allowed to cool.

The present invention also provides a method for producing a collapse resistant, molecularly oriented, heat set polyester container for use in hot fill applications, which method comprises the steps of forming a molecularly oriented polyester container having at least one preselected region which projects inwardly into said container in a first configuration; heating said oriented container at a temperature sufficient to induce rapid crystallization of the polyester to form a heat set container, at least said region being heated to a temperature and for a time sufficient to produce from about 28% to about 32% crystallinity in said region; reshaping said region outwardly to a second configuration at a temperature from just above the hot fill product temperature up to the heating temperature; and cooling the resulting container while maintaining said region in said second configuration to provide a thermoelastically deformable region which tends to return to said first configuration after hot filling and sealing said resulting container to at least partially relieve pressure forces which tend to collapse said container after hot filling and sealing.

Figure 1:
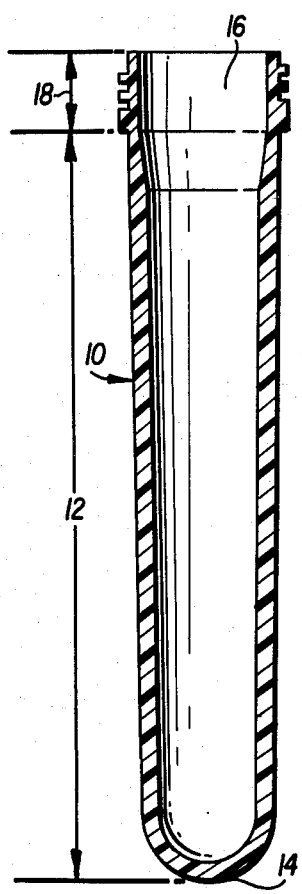
FIG. 1 is a sectional view of a preform useful in the present invention.

Container deformation upon the hot filling and sealing of material in a polyester container results from two distinct phenomena. The first is a thermal phenomenon. When the hot contents contact the polyester container, the container walls shrink, usually unevenly, causing distortion of the container. Polyester containers which have not been heat treated exhibit from about 12 to 50 percent volumetric shrinkage when hot filled at temperatures of about 190° F. (87.8° C). By use of suitable heat treatment techniques as hereinafter described more fully, it is possible to produce a polyester container which exhibits less than about 1 percent thermal shrinkage at this temperature. Thermal stabilization alone, however, is not sufficient to render a polyester bottle suitable for most commercial hot fill applications, in which capping is effected immediately after filling to facilitate high speed processing.

The second deforming phenomenon present in hot fill applications results from the internal partial vacuum generated in the container after it is hot filled and sealed at or near the filling temperature. An estimation of the degree of internal vacuum which typically develops in a hot filled container can be calculated by assuming that a container has an initial internal volume of 1030 cc and is filled with 1000 cc of water at 200° F. (93.3° C.) which cools to a final temperature of 40° F. (4.4° C.). The amount one liter of water will shrink in volume upon cooling from 200° F. (93.3° C.) to 40° F. (4.4° C.) can be approximated, using specific volumes as about 3.7% or 37 cc. The bottle shrinkage due to the coefficient of thermal expansion upon cooling can be calculated as approximately 1.59% reduction in internal volume. Assuming the bottle shrinks an additional one percent in the thermal cycle from room temperature to 200° F. (93.3° C.) due to relaxation of orientation stresses, the total bottle shrinkage will be 2.59%. The head space will then experience a net change in volume of approximately 3.7%−2.59%=1.1% contents expansion or 11 cc.

The resulting pressure in the head space will then be between the following extremes for initial head space of 30 cc:

(1) For an initial head space consisting of saturated 200° F. (93.3° C.) air when capped, which then cools to 40° F. (4.4° C.) the head space pressure will be 1.92 psia (0.135 kg/cm² absolute) or a vacuum of 12.8 psi (0.8985 kg/cm²).

(2) For an initial head space consisting of saturated 160° F. (71.1° C.) air when capped, which then heats to 200° F. (93.3° C.) before cooling to 40° F. (4.4° C.) the final head space pressure will be 6.6 psia (0.464 kg/cm² absolute) or about 8.1 psi (0.569 kg/cm²) of vacuum. Thus, for the bottle and filling conditions described above, the vacuum developed could range from approximately 8 to 13 psi (0.562 to 0.914 kg/cm²).

In order to avoid collapse from these internal vacuum forces it is necessary to either produce a container which is sufficiently rigid to withstand forces of this magnitude or to provide for a reduction in the container volume to offset the volume change during cooling. Practical limitations in the manufacture of polyester containers, however, prevent the production of commercially acceptable containers of sufficient rigidity to withstand these pressure forces. Thus, the present invention relies, at least in part, on container volume reduction to relieve the pressure forces which tend to collapse the container. An estimate of the total volume change necessary to offset all the cooling-induced shrinkage can be calculated as follows.

Assuming the 1030 cc bottle is filled with 1000 cc of water at 200° F. (93.3° C.) as described above, during cooling to 40° F. (4.4° C.) the water contracts in volume by approximately 37 cc. The head space contraction is approximately 25 cc and the bottle contraction due to thermal shrinkage will be 2.59% of 1030 cc or 27 cc. Thus, for the worst case, the volume to be offset is about 35 cc. The head space volume change will be much less for a more realistic initial head space temperature of 160° F. (71.1° C.). In this case the head space volume would reduce by 13 cc, giving a total volume to be offset of 23 cc. In general the total volume to be offset in the container will vary, according to conditions present, in the range of from about 1 to 5% and more typically from about 2 to about 5% of the total container volume.

The above estimations of changes in pressure and volume in a sealed, hot filled container are merely intended to demonstrate the nature of the problem that is caused as the container cools. One skilled in the art can readily determine the appropriate conditions existing in any given filling system and arrive at similar values for that system by the method outlined above.

The present invention achieves an appropriate offsetting decrease in container volume by introducing a thermoelastic memory into at least one preselected region of the container wall. After hot filling and sealing, the container wall in this region is thermoelastically deformed inwardly to reduce the container volume an offsetting amount. The thermoelastic memory region is preferably created by molding that region of the container wall into a first configuration where it is heat set at an elevated temperature. This region is then reformed outwardly at a lower temperature to form a second configuration. The term thermoelastically deformable as used in the specification and claims refers to the property of controlled heat-induced deformation of a material to a previous configuration. When exposed to hot contents after filling and capping, this region "remembers" the first configuration formed at a higher temperature and tends to return to that configuration.

The present invention is directed to improved containers formed from thermoplastic polyester materials and particularly those based on polyalkylene (e.g., polyethylene) terephthalate. The polyethylene terephthalate polymers useful in the present invention are generally prepared from terephthalic acid or its ester forming derivates and ethylene glycol or its ester forming derivates.

In general, at least about 97% by weight of the polymer can comprise repeating ethylene terephthalate groups of the formula:

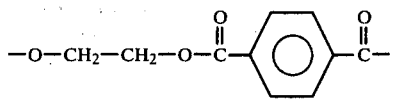

The remainder of the polymer can comprise various ester forming compounds.

The present invention also contemplates the use of copolymers of the polyethylene terephthalate in which a minor proportion, for example, up to about 10% by weight, of the ethylene terephthalate units are replaced by compatible monomer units in which the glycol moiety of the monomer is replaced by aliphatic or alicyclic glycols such as trimethylene glycol, tetramethylene glycol, polytetramethylene glycol, hexamethylene glycol, dodecamethylene glycol, diethylene glycol, polyethylene glycol, polypropylene glycol, propane-1,3-diol, butane-1,4-diol, neopentyl glycol and cyclohexanedimethanol, bisphenols, and other aromatic diols such as hydroquinone and 2,2-bis(4'-B-hydroxethoxyphenyl)propane. Examples of dicarboxylic acid moieties which can be substituted into the monomer unit include aromatic dicarboxylic acids such as phthalic acid, isophthalic acid, naphthalenedicarboxylic acid, diphenyldicarboxylic acid, diphenoxyethanedicarboxylic acids, bibenzoic acid, and aliphatic or alicyclic dicarboxylic acids such as adipic acid, sebacic acid, azelaic acid, decanedicarboxylic acid and cyclohexanedicarboxylic acid. In addition, various multifunctional compounds such as trimethylolpropane, pentaerythritol, trimellitic acid and trimesic acid can be copolymerized with the polyethylene terephthalate polymer in amounts of up to about 2 percent by weight. The above-described comonomers or multifunctional compounds can be employed in amounts which do not adversely affect the crystallinity of the polyester polymer.

The polyethylene terephthalate polymers useful in the present invention can also contain other compatible additives and ingredients which do not adversely affect performance characteristics of the container such as adversely affecting the taste or other properties of products packaged therein. Examples of such ingredients include thermal stabilizers, light stabilizers, dyes, pigments, plasticizers, fillers, antitoxidants, lubricants, extrusion aids, residual monomer scavengers and the like.

Polyethylene terephthalate having an intrinsic viscosity of from about 0.55 to about 1.04 and preferably from about 0.55 to 0.85 can be employed as the starting material used in producing the containers of the present invetion. Intrinsic viscosity measurements are made according to the procedure of ASTM D-2857, by employing $0.0050 \pm 0.00002$ g/ml of the polymer in a solvent comprising o-chlorophenol (melting point 0° C.), respectively, at 30° C. Intrinsic viscosity (I.V.) is given by the following formula:

$$I.V. = \frac{\ln \frac{V_{Soln.}}{V_{Sol.}}}{C}$$

where:

$V_{Soln.}$ is the viscosity of the solution in any units.

$V_{Sol.}$ is the viscosity of the solvent in the same units and

C is the concentration in grams of polymer per 100 mls of solution.

The invention will now be described with reference to the drawings. FIG. 1 shows elongated tubular preform 10 which can be distended into the shape of a container. The illustrated preform is circular in cross section and includes a body portion 12 closed at one end 14 and open at the opposite end 16. Annular finish region 18 extends around the preform at the open end. In the embodiment illustrated, the finish 18 is formed in the preform molding step and is not intended to be remolded with body 12 during the formation of the container, though it is within the scope of this invention to so mold the finish during container formation. In the preferred embodiment the finish region 18 is treated during the preform molding step in a manner described hereinafter to increase the dimensional stability of this region. Dimensional stability of the finish is necessary to obtain a consistent leakproof seal with the container closure means.

The shape of the container preform may vary considerably from the configuration shown in FIG. 1, with the actual shape depending primarily on the shape of the container to be molded. For example, such preforms may be planar, bulbar, ribbed, cup-shaped, bell-shaped, conical, frustoconical, non-round in cross section, tapered along the length or of some similar configuration having either varying or constant thickness. The wall thickness and the weight of preform 10 may also vary widely. Generally the preform has relatively thick walls along body 12, typically ranging from about 1250μ to about 5000μ or more, and typically weighs from about 15 to 150 grams or more. The preform body length, of course, may similarly vary widely and typically ranges from about 5 cm to about 30 cm or more. The design of the preform finish region can also vary from the threaded type shown to accommodate other types of closure means.

The polyester preform useful in the practice of the present invention should be substantially amorphous. Typically, polyethylene terephthalate preforms may contain as much as up to about 15 percent crystallinity and still be known in the art as substantially amorphous. Percent crystallinity of a polyester material is given by the following formula:

$$\% \text{ Crystallinity} = \frac{d_s - d_a}{d_c - d_a} \times 100$$

where:

$d_s$ = density of test sample in g/cm$^3$ $d_a$ = density of an amorphous film of zero percent crystallinity (for PET 1.333 g/cm$^3$)

$d_c$ = density of the crystal calculated from unit cell parameters (for PET 1.455 g/cm$^3$).

Density measurements are made by the density gradient method described in ASTM 1505.

The polyester preform suitable for the practice of the present invention may be formed by any conventional molding techniques such as injection or blow molding, extrusion, thermoforming from sheet material either with or without mechanical plug assistance, spin welding, compression molding, vacuum forming and the like. Injection molding is the preferred preform manufacturing process, since this process provides parts having very uniform dimensions and weight distribution. The molded preform is preferably cooled rapidly to prevent excessive crystallization and whitening of the preform. In the preferred embodiment, however, a high degree of crystallization and whitening is intentionally introduced in the finish region 18 to enhance the dimensional stability thereof. This effect is preferably achieved by employing gradual cooling of the finish region after injection molding. Unless otherwise indicated, reference hereinafter in the specification and claims to a preform or the container formed therefrom is intended to relate to those portions of the preform or container below the finish region.

Forming the container shape from the preform may be accomplished by any conventional molding techniques involving distension of the preform. In this regard, vacuum or pressure forming by drawing a sheetlike preform against the walls of a wide mouth die cavity may be used as well as known stretch-blowing techniques hereafter described. The particular remolding system or combination of systems chosen will usually be influenced by the configuration of the final container which can vary widely and is primarily determined by the nature of the contents to be packaged therein.

The distension step should be carried out at a temperature in the molecular orientation temperature range for the polyester material being employed. In one commonly used molding process the injection molded preform is quenched completely to room temperature before reuse. In this process the preform is reheated to within the orientation temperature range before the distension step. Reheating of cold preforms can be effected by any known methods such as passing the preform through a heating means, e.g., radiant or forced hot air heaters. In an alternative process the hot injected molded preform is partially quenched to a point where the outside skin temperature will allow handling. The temperature in the preform wall is then allowed to equilibrate to an average temperature within the orientation temperature range. Achieving a suitable orientation temperature prior to distending by both the reheat and cool down methods are well known in the container forming art.

Generally speaking molecular orientation of an orientable thermoplastic preform may occur over a temperature range varying from just above the glass transition temperature (that temperature or narrow temperature range below which the polymer is in a glassy state) up to just below the melt temperature of the polymer. However, as a practical matter the formation of oriented containers is successfully carried out when the preform is at a much narrower temperature range defined as the molecular orientation temperature range. If orientation is attempted at a temperature too close to the glass transition temperature the material is too stiff to stretch in a process using conventional equipment. As the temperature of orientation is increased the processability improves greatly, but a practical upper limit is reached at or near the temperature at which large aggregates of crystallites called spherulites begin to form. The orientation process is adversely affected by spherulite growth.

For the substantially amorphous polyester materials emloyed at the preform stage according to the present invention the molecular orientation temperature range will vary from about 20° F. (11.1° C.) to about 65° F. (36.1° C.) and preferably from about 30° F. (16.7° C.) to about 40° F. (22.2° C.), above the glass transition temperature of this polyester material. A typical amorphous polyethylene terephthalate polymer, which has a glass transition temperature of about 168° F. (75.6° C.), generally has an orientation temperature range of from about 195° F. (90.6° C.) to about 205° F. (96.1° C.).

Figure 2:
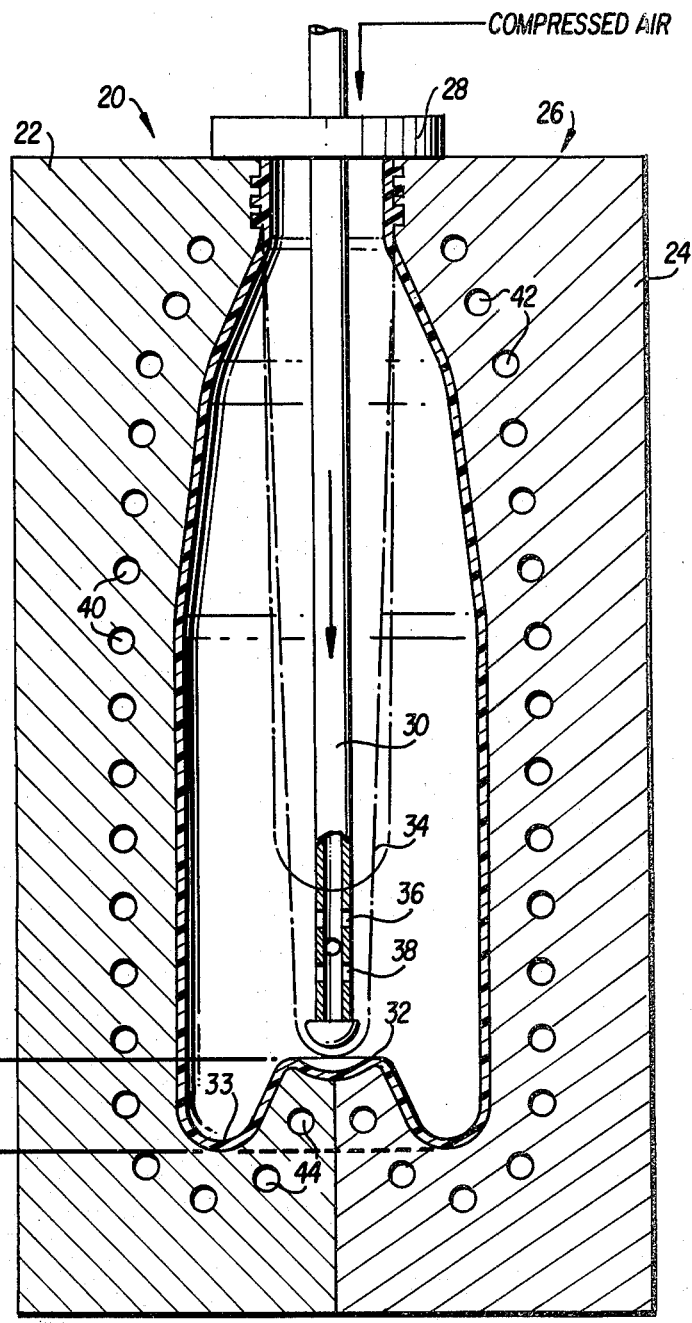
FIG. 2 is a sectional view of a first blow molding apparatus useful in the present invention for distending the preform into a container configuration, and for heat treating the distended preform in this configuration, the initial preform and stretched preform being shown in phantom lines.

The following description relates primarily to a stretch-blowing system which is the preferred method for distending the preform into a container configuration. Referring now to FIG. 2, stretch blow assembly shown generally at 20 converts the preform into a container having walls which are molecularly oriented. Preform 10, which has been reheated or cooled down to a temperature within the molecular orientation temperature range for the polyester material, is enclosed within partible sections 22 and 24 of blow mold 26. Stretch mechanism 28 is then moved into place over the open end of the preform, whereupon telescopic rod member 30 is extended by a suitable mechanism not shown in order to draw preform end 14 against the base portion 32 of the internal cavity blow mold 26, thereby axially stretching the body portion 12 in the manner illustrated in phantom at 34. Simultaneously therewith or preferably immediately thereafter, a pressurized blowing medium is admitted to the preform through openings 36 and 38 of rod 30 to radially stretch the axially stretched preform outwardly to conform to the inner surface of the cavity walls of mold 26. It is also within the scope of the invention to eliminate rod 30 and achieve stretching solely by means of a pressurized blowing medium especially where relatively small containers are being formed.

The pressurized blowing medium can be any fluid which does not adversely interact with the polyester material of the preform. Compressed air is the preferred medium. Any suitable fluid pressure which will distend the preform material to conform to the mold cavity surface without rupturing the distending shape can be employed. Typically, gauge air pressures of up to about 45 kg/cm$^2$ and preferably from about 9 kg/cm$^2$ to about 30 kg/cm$^2$ are suitable. The blowing medium can be heated to help maintain the preform in the orientation temperature range during stretching if desired. Typically the stretching and blowing portion of the sequence can be effected in a very short period of time, on the order of less than about 50 seconds and preferably from about 2 to 10 seconds.

The configuration of the container produced in mold 26 by this stretch-blowing process corresponds substantially to the desired final container. Thus essentially all the stretching will take place in this first operation. The extent of stretching effected in the stretch-blowing operation may vary within wide limits and can be controlled by fixing the relative dimensions of the initial preform and the finished container. One commonly used measure of the extent of stretch achieved is the combined percent stretch. For generally cylindrical containers, e.g., bottles, this value is the sum of the percent axial stretch ($S_A$) and the percent radial stretch ($S_R$) which are given by the following formulas:

$$S_R = \frac{D_b - D_p}{D_p} \times 100$$

$$S_A = \frac{L_b - L_p}{L_p} \times 100$$

where:
  $D_b$ = maximum outside diameter of the bottle
  $D_p$ = minimum inside diameter of the preform
  $L_b$ = length of the bottle below the finish and
  $L_p$ = length of the preform below the finish Typically, commercial size polyester containers of from about 120 to about 3780 cc made according to the present invention can have a combined percent stretch of from about 150% to about 475% and preferably about 200% to about 400%. Within these ranges the percent axial stretch may vary from about 5% to about 120% and preferably from about 25% to about 100%, whereas the percent radial stretch may vary from about 145% to about 355% and preferably from about 175% to about 300%.

In mold 26 at least one region which later becomes thermoelastically deformable is molded into a first configuration. While this region(s) can be located on any portion of the container, the preferred location of the thermoelastically deformable region is at the base of the container. As shown in FIG. 2, base portion 32 beginning just inside a flat seating ring surface 33 projects generally inwardly of the container for a distance shown as D1.

In the next step of the process of the present invention, the container formed in mold 26 is subjected to a heat treatment step while it is still held in contact with the cavity walls by the pressurizing medium. The heat treatment step is carried out at a temperature sufficient to induce rapid crystallization of the polyester material (but below its melting temperature) to increase the crystallinity of the polyester material to a value above about 28%. Polyester material conventionally formed within its molecular orientation temperature range in a cold mold without further heat treatment, exhibits from about 20% to about 28% crystallinity. The container of the present invention exhibits numerous improved properties due to the increased crystallinity resulting from the heat treatment step.

The amount of crystallinity achievable in a heat treated container is a function primarily of the temperature of heat treatment. Depending on the particular material employed and the desired crystallinity, heat treatment temperatures may range from the upper end of the orientation temperature range up to about 450° F. (232.2° C.). Preferred heat treatment temperatures for PET are from about 240° F. (115.6° C.) to about 400° F. (204.4° C). As the intrinsic viscosity of the polyester material increases, the temperature needed to achieve a given percent crystallinity will also increase. Heat treatment times according to the present invention can vary from a few seconds up to several minutes or more. During the initial stages of heat treatment the change in crystallinity achieved is time-temperature dependent, however, extended heating times generally do not result in a significant further increase in crystallinity. Preferred are heat treatment times up to about 10 seconds with most preferred times being from about 2 to about 5 seconds.

The region which later becomes thermoelastically deformable should be heated treated at a temperature and for a time sufficient to produce about 28% to about 32% crystallinity in the region, depending on the intrinsic viscosity of the polyester material employed. Typically temperatures of less than about 285° F. (140.6° C.) and preferably in the range of about 240° F. (115.6° C.) to 270° F. (132.2° C.) will achieve this result. Treating the entire container in this temperature range will result in a container with acceptable thermal distortion, i.e., less than about 1%, for hot filling up to about 185° F. (85° C.). Clarity of the final bottle will also be good using this temperature range for the entire bottle.

When filling temperatures of 190° F. (87.8° C.) or more are contemplated it is desirable to use the differential heat treatment process described in commonly assigned copending application Ser. No. 123,099 entitled Polyester Container for Hot Fill Applications, and filed on even date herewith in the name of P. D. Agrawal, and now abandoned, which is hereby incorporated by reference.

Differential heating comprises heating first molecularly oriented areas which have undergone a reduction in thickness of greater than about 60% during the distending step to a temperature and for a time sufficient to produce at least about 35% crystallinity in the first areas and heating second molecularly oriented areas which have undergone a reduction in thickness of less than about 60% during distending to a temperature and for a time sufficient to produce from about 28% to about 32% crystallinity in the second areas. Typically, temperatures of up to about 285° F. (140.6° C.) and preferably about 240° F. (115.6° C.) to 270° F. (132.2° C.) are employed to heat treat the low stretch areas (<60% reduction in thickness) and temperatures above about 285° F. (140.6° C.) and preferably from about 300° F. (148.9° C.) to about 400° F. (204.4° C.) are employed to heat treat the high stretch areas (>60% reduction in thickness). In general it is preferred to locate the thermoelastically deformable region in a low stretch area such as the base since lower crystallinity is also required in the thermoelastic region.

Referring again to FIG. 2 the heat treatment of the present invention can be effected by maintaining mold sections 22 and 24 at an elevated temperature. Differential heating is preferably accomplished by maintaining the appropriate portions of mold sections 22 and 24 at different temperatures. In the embodiment shown, passages 40 carry heated oil or other fluid in heat exchange relationship with the sidewall-forming portions of the mold while passages 42 and 44 carry a heat exchange fluid to the shoulder and base forming portions respectively. Heating can also be effected by electric heating elements or by supplying a heating pressurizing fluid into the container.

Figure 3:
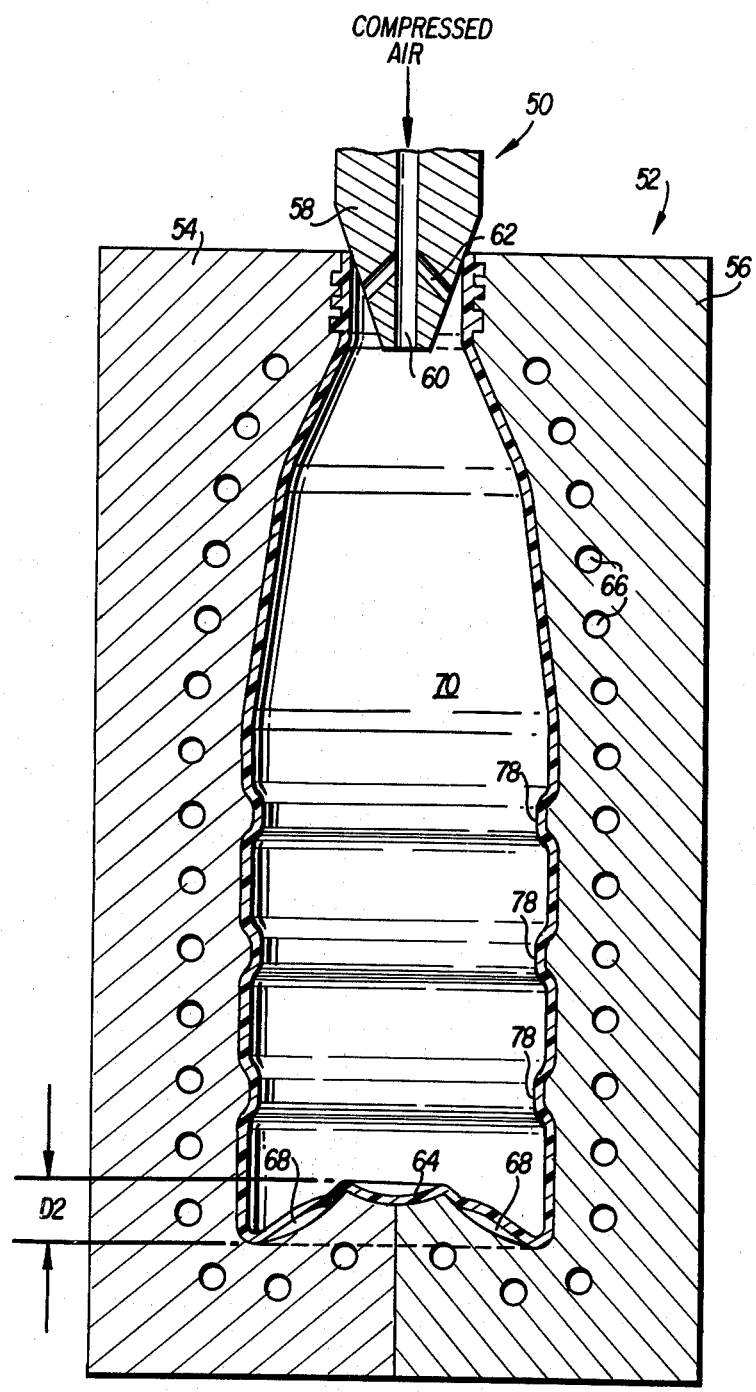
FIG. 3 is a sectional view of a second blow molding apparatus useful in the present invention for remolding a heat treated container into a final configuration and cooling the remolded container in this configuration.

After the container has been heat treated in mold 26 while held in the configuration shown in FIG. 2, the thermoelastic base region is then remolded outwardly to a second configuration in a cooling mold. This remolding/cooling step can be performed in the same mold if this mold is provided with a changeable base section and means for switching from heating to cooling. It is preferred, however, to transfer the container formed in mold 26 to a second blow molding apparatus of the type shown generally at 50 in FIG. 3. The transfer time between hot mold 26 and cooling mold 50 should be kept as short as possible to keep the volumetric shrinkage of the container during hot filling at an acceptable level. In practice, shuttle times between the hot and cold molds of from about 1 to 3 seconds have proven successful. Longer or shorter times can be employed as long as the shrinkage properties of the final product are not adversely affected. As indicated above, volumetric shrinkage values of less than about 1% at a product filling temperature of 190° F. (87.8° C.) are preferred according to the present invention. Apparatus 50 comprises a blow mold 52 with partible sections 54 and 56, and a blowing nozzle or plug 58 with openings 60 and 62 for admitting a pressurized blowing medium. In the second molding step the container is reblown against the cavity walls of mold 52 in the same general manner that the blowing in mold 26 was effected. Mold 52, however, has a different configuration in the region which becomes thermoelastically deformable. As seen in FIG. 3 the base region 64 is remolded outwardly to a second configuration which projects inwardly a distance shown as D2. This distance is less than D1 resulting from the configuration formed in mold 26. In the preferred embodiment mold 52 also imparts some remolding in the sidewall portions of the container to produce annular ribs 78 or other suitable stiffening members. The stiffening members provide additional resistance against buckling forces. By stiffening the sidewalls the base region can be rendered more susceptible to vacuum collapse since the forces acting on the container wall tend to concentrate at the weakest point.

Figure 5:
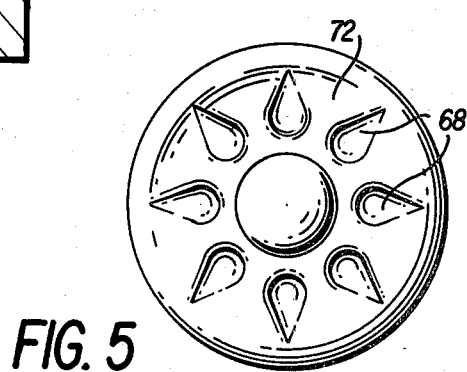
FIG. 5 is a bottom plan view of a container according to the present invention.

This concentration of force aids in initiating thermoelastic deformation. It is also preferred to include a plurality of stress points 68, best seen in FIG. 5, equally spaced from each other around the periphery of the base in the remolded base configuration. These stress points operate to render the thermoelastic deformation of the base region more uniform by providing predetermined crease points which ensure that the deformation necessary for the base to move up occurs uniformly rather than randomly.

Figure 6:
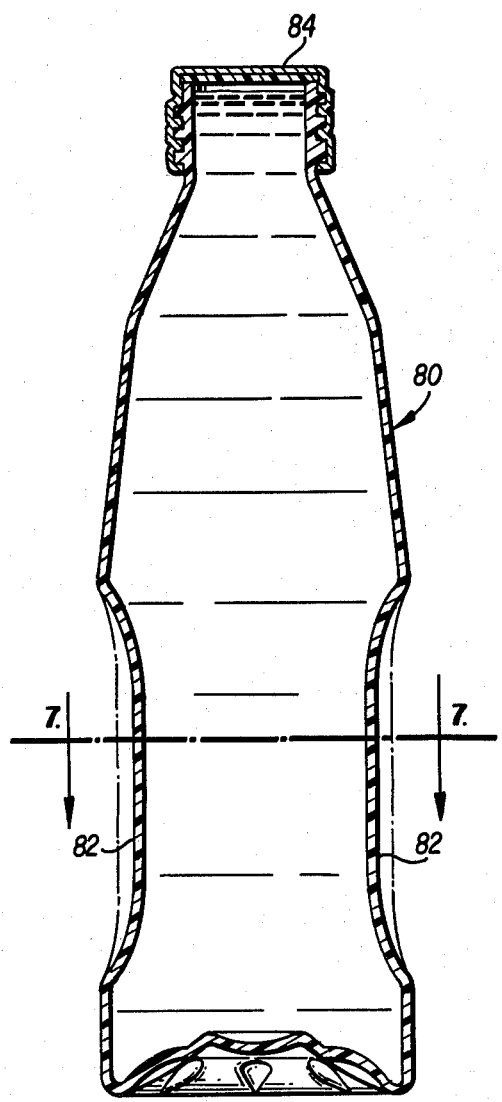
FIG. 6 is a sectional view of another form of container according to the present invention shown filled with a liquid and sealed, the container sides prior to controlled pressure induced deformation being shown in phantom lines.
Figure 7:
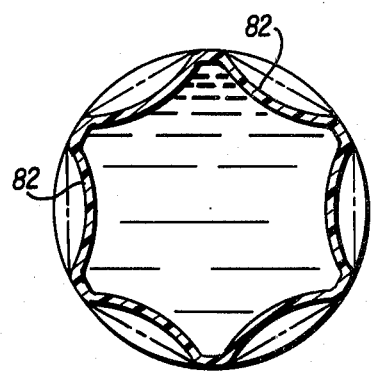
FIG. 7 is a sectional view taken along line 7—7 of FIG. 6.

In another embodiment, shown in FIGS. 6 and 7, the container of the present invention is also provided with at least one pressure deformable region which does not respond to the elevated filling temperatures, but which will exhibit controlled uniform inward deformation in response to the internal vacuum forces. In the preferred form this pressure deformable region comprises at least one flat area or panel on the container sidewall. Pressure forces tend to deform a flat panel uniformly. This pressure deformable region can be made a part of the container design in an aesthetically pleasing fashion. The configuration of the container of this embodiment after hot filling and sealing is shown generally as 80 in FIGS. 6 and 7. Sidewall panels 82 are shown in the deformed state. The container is sealed by cap 84. The phantom lines show the configuration of the container as molded with panels 82 substantially planar, i.e., flat. Upon filling and sealing a container made according to this embodiment of the present invention, the thermoelastically deformable region and the pressure deformable region together result in enough container volume reduction to offset the vacuum forces developed.

The remolding step should be carried out at a temperature at least slightly above the intended filling temperature of the container to prevent instantaneous thermoelastic recovery upon filling. To achieve maximum vacuum collapse resistance it is necessary to seal the container before any significant movement of the thermoelastic region takes place. When remolded at a temperature above the filling temperature the movement of the thermoelastic region is delayed until the combined thermal stresses and pressure forces (from the internal negative pressure) coact to cause inward deformation of the region. Hot fill product temperatures generally range from about 175° F. (79.4° C.) to about 200° F. (93.3° C.). The lower limit on the temperature of remolding generally shold be at least about 5° F. (2.8° C.) above the intended hot fill product temperature and preferably at least about 10° F. (5.5° C.) above the hot fill temperature. Remolding temperatures even closer to the product fill temperature can be employed if the time interval between filling and capping is very short. Typically the lower limit of the reforming temperatures is from about 180° F. (82.2° C.) to about 210° F. (98.9° C.) depending on the intended hot fill temperatures. The upper limit of temperature for this remolding step is dictated by the temperature of the previous heat treatment step. For example, in the preferred embodiment the container heat treated in a first configuration is transferred to a cooling mold and reblown to reform the thermoelastic region. By controlling the transfer time between molds, and thereby the resulting air cooling, the temperature at the reforming, i.e., reblowing, step can be controlled.

After the thermoelastic region is reformed as described above, this region and the remainder of the container are cooled in cooling mold 52, while held against the surface of the mold cavity walls in this second configuration. The cooling can be effected by having the mold cavity walls at room temperature prior to transfer of the container to the mold. If desired, additional or more rapid cooling can be effected by cooling the pressurized blowing medium before it is admitted to the container. Alternatively, the mold can be provided with cooling fluid heat transfer passages 66 surrounding the cavity walls in the manner described above with respect to the heating system in hot mold 26.

Cooling is preferably carried out at a temperature and for a time sufficient to provide a container which can be further handled without damage to the container. In order for this condition to be met it is generally necessary to cool the container to a temperature below the glass transition temperature of the crystallized polyester. Heat treatment of the kind described above raises the glass transition temperature of PET to about 190° F. (87.8° C.). The cooling process is time-temperature dependent and shorter periods of time can be used with lower temperatures and vice versa. Cooling times of up to about 1 minute can be employed. Generally cooling times of from about 1 to about 10 seconds are preferred and from about 2 to about 4 seconds are most preferred. Typically, cooling water temperatures of from about 20° F. (−6.7° C.) and 150° F. (65.6° C.) and preferably about 40° F. (4.4° C.) to 100° F. (37.8° C.) can be satisfactorily employed.

The heat-treated container can be cooled by reblowing it in a separate cooling mold of somewhat larger dimensions which reforms the container to its final size. In the preferred embodiment, however, the final container should be approximately the same size as the container formed in the hot mold. If the cold mold is too much larger than the hot mold, the shrinkage properties of the final container upon hot filling may be adversely affected. In order to avoid the formation of flash or pinch lines, however, the cold mold can be slightly larger than the hot mold. An increase in size in the cold mold of about 1% or less in dimensions all the way around the mold cavity (excluding the thermoelastic reforming zone) can be employed without any adverse effect on the shrinkage properties. Modification of the container shape to introduce ribs, stress points, pressure deformable panels or other structural or decorative features preferably is effected in cold molding step.

The container according to the present invention may have any desired size, shape or configuration. Typical containers include bottles, jars, cans and the like in sizes ranging from 120 cc to 3780 cc capacity or more. The container generally does not have uniform wall thickness due to differences in the amount of stretch in different areas. The container wall thickness can vary widely depending on the custom design of the container. Container sidewalls typically vary in thickness from about 250$\mu$ to about 900$\mu$ and preferably from about 300$\mu$ to about 650$\mu$. Thickness in the bottom portion will generally run from about 250$\mu$ to about 1800$\mu$ and preferably from about 300$\mu$ to about 1250$\mu$. Shoulder areas will typically have a thickness from about 350$\mu$ to about 1250$\mu$ and preferably from about 1250$\mu$ to about 900$\mu$. The container of the present invention preferably is vertically self-supporting as molded although container configurations which require the addition of a separate cup-like support piece to the container base to achieve this property are within the scope of this invention.

Figure 4:
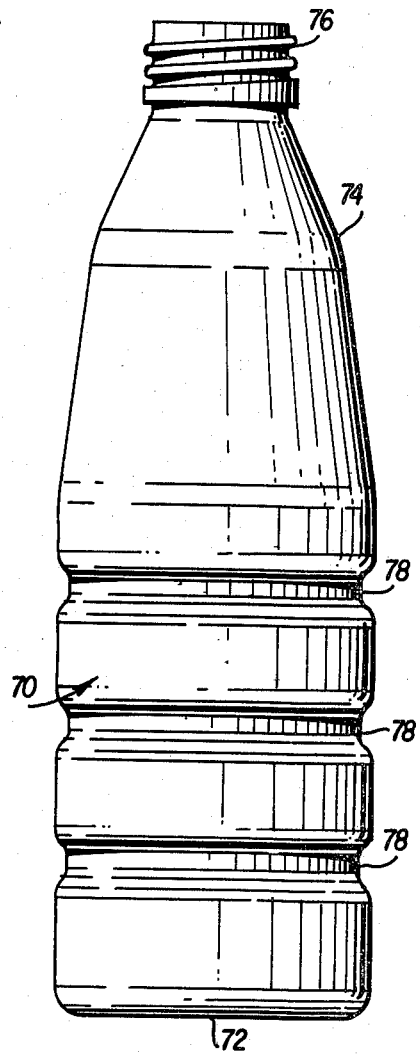
FIG. 4 is an elevation view of a container according to the present invention.

One preferred container of the present invention shown in FIG. 4 has been subjected to the above-described differential heat treatment and thus has above 35% and preferably about 37% crystallinity in the sidewalls 70 and from about 28 to 32% crystallinity in base 72 and shoulder 74. The container is substantially clear throughout, i.e., has low percent haze. In general the container walls should have a percent haze (transmission) of less than about 25%. In the specification and claims the term throughout, as it relates to substantial clarity or a given percent haze is intended to refer primarily to that portion of the container below the finish 76 which as indicated above may be intentionally spherulized to improve dimensional stability. Similarly, it is within the contemplation of the present invention to intentionally introduce spherulization (i.e., high haze) in limited areas of the container to achieve decorative effects.

Percent haze for transmitted light ($H_T$) is given by the following formula:

$$H_T = \frac{Y_d}{Y_d + Y_s} (100)$$

where:
$Y_d$ is the diffuse light transmitted by the specimen
$Y_s$ is the specular light transmitted by the specimen
The diffuse and specular light transmission values can be measured in accordance with ASTM Method D1003, using any standard color difference meter such as the Model D25D3P manufactured by Hunterlab Inc.

The container of the present invention which has been subjected to differential heat treatment also exhibits very good volumetric thermal shrinkage properties. Volumetric shrinkage levels of less than about 1% at product filling temperatures of about 190° F. (87.8° C.) are achievable by the container of the present invention. Preferably, the container according to this embodiment exhibits less than about 1% volumetric shrinkage at product fill temperatures of about 195° F. (90.6° C.). Volumetric shrinkage can be determined by comparing the internal volume of the container both before and after hot filling (without capping and after the hot filled container is allowed to cool to room temperature). The recitation that volumetric shrinkage of the product of the present invention is less than about 1% at product filling temperatures of about 190° F. (87.8° C.) is not intended to require hot filing at this temperature. This temperature is merely recited to provide a reference point for measuring one of the improved properties achieved by the present invention.

The containers produced according to the present invention are especially well suited to hot fill applications. In the manufacture or sterilization of many food and pharmaceutical products it is desirable to place the product into the container and seal the container while the contents are still at the elevated processing temperature. Food products which are conventionally hot filled into glass or other containers include pickles and pickle relish, catsup, jellies and preserves, syrup, juices, spaghetti sauce and the like. These materials cannot be suitably packaged in prior art polyester containers due to thermal shrinkage and/or vacuum-induced collapse which results when the containers are sealed before the contents are allowed to cool. The containers of the present invention are suitable for hot fill applications employing filling temperatures of up to about 190° F. (87.8° C.) and preferably up to about 195° F. (90.6° C.) or more. Moreover, the containers of the present invention are particularly useful in applications where the filled container is capped immediately after filling or at a time before the contents have cooled appreciably. Typical commercial hot filling applications require sealing within less than 1 second up to about 10 seconds after the filling operation.

The container of the present invention avoids the problems of vacuum collapse in the following manner. After the container has been filled and sealed, the heated thermoelastically deformable region, e.g., the base, tends, with the aid of the developing pressure forces, to deform inwardly in an effort to resume the configuration set in the hot molding step. While the memory regain is not complete, it has been found that the configuration shown in FIG. 3 tends to return approximately to that configuration shown in FIG. 2. The container volume change resulting from the inward thermoelastic deformation generally is sufficient to relieve a major portion of the vacuum forces generated during cooling. It may be necessary, however, to provide the container of the present invention with auxilliary pressure relieving or resisting means such as pressure deforming panels or sidewalls of sufficient rigidity to resist any remaining unrelieved pressure forces. Rigidity is most conveniently increased by integrally molding stiffening members such as ribs and the like into the sidewalls.

The following specific examples are intended to illustrate more fully the nature of the present invention without acting as a limitation on its scope.

EXAMPLE 1

This example demonstrates the production of a heat set polyester container having a base with thermoelastic memory. A 58 g preform of the type shown in FIG. 1 having a length of 18.29 cm and a diameter of 2.94 cm was prepared from polyethylene terephthalate having an intrinsic viscosity of 0.72. The preform was stretch/blow molded in an assembly of the type shown in FIG. 2 to form a container having the desired final size and shape except for the base portion which was molded in a high push up configuration which extended into the container at a distance of about 1.71 cm (D1). The molded container was a generally cylindrical bottle having an overall length (exclusive of the finish) of 27.99 cm, a diameter of 9.79 cm and a capacity of 1420 cc. The molded container had an axial stretch of 69%, a radial stretch of 199% and a combined stretch of 268%.

The molded container was held in contact with a heated mold of the type shown in FIG. 2 for about 2–3 seconds. The temperature in the base and shoulder zones was about 240° F. (115.6° C.) and the sidewall zones were heated at about 325° F. (162.8° C.). The molded heat set container was then transferred to a second mold of the type shown in FIG. 3 where the base region was reshaped to a low push up configuration which extended into the container a distance of about 0.95 cm (D2). The second mold was cooled with water at 75°–80° F. (23.9°–26.7° C.). After the container was held in the cooling mold for about 3–4 seconds it was removed from the second mold.

The container formed as described was filled with water at 190° F. (87.8° C.) and immediately sealed with an air tight cap. After the contents of the filled container had cooled to ambient temperature the base portion had moved inwardly to partially relieve the pressure caused by the internal vacuum. The remainder of the pressure forces were taken up by uncontrolled pressure deformation in the sidewalls.

EXAMPLE 2

This example demonstrates another embodiment of the process according to the present invention for forming a collapse resistant polyester bottle. A 0.72 I.V. PET preform of the same dimensions as that used in Example 1 was distended in a stretch/blow molding assembly of the type shown in FIG. 2 to form a container having a diameter of 8.56 cm, a length of 27.94 cm and a capacity of 1 liter. The base was provided with a high push up as in Example 1. The molded container was heat treated as described in Example 1 in the first mold.

The heat set container was then transferred directly to a somewhat larger cooling mold of the type shown in FIG. 3 where the container was reblown to reform the base to a lower push up, to expand the containers to its final size (length=29.72 cm, diameter=8.79 cm, capacity=1365 cc) and to mold stiffening ribs into the container. The container was cooled in the second mold as in Example 1. After filling with water at 190° F. (87.8° C.) and capping the container contents were allowed to cool to ambient temperature. As in the case of Example 1, the base moved inwardly to partially relieve the pressure forces. In this case the stiffened sidewalls did not exhibit any visual sidewall deformation.

EXAMPLE 3

This example demonstrates that merely stiffening the sidewalls of a heat set PET container does not prevent vacuum induced collapse. Example 2 was repeated in all material respects except that the thermoelastic base was not introduced into the container. Upon filling with water at 190° F. (87.8° C.), capping and cooling the container exhibited unacceptable distortion (buckling) of the sidewalls.

EXAMPLE 4

This example demonstrates the production of a container according to another embodiment of the present invention which has a thermoelastically deformable base and pressure deformable panels in the sidewalls. The preform employed was 17.15 cm in length (exclusive of the finish) and had a diameter of 2.79 cm. This preform was made from 48.1 grams of 0.65 I.V. PET. The preform was stretch/blow molded in a hot mold as in Example 1 to form an oriented container of 24.7 cm in length and 7.11 cm in diameter. The base was formed with a high push up (D1=0.375") in the hot mold.

The container was heat treated as in Example 1, i.e., the sidewalls at 325° F. (162.8° C.) and the base and shoulder at 240° F. (115.6° C.). The molded heat set container was then transferred to the cooling mold. The final product formed in this mold had a length of 25.4 cm, a diameter of 8.02 cm, a low base push up (D2=0.300") and had flat rectangular panels molded into the sidewall.

After cooling the resulting container was filled with water at 190° F. (87.8° C.) and capped. When the contents had cooled to ambient temperature, the base had moved inwardly and the panels had also moved inwardly to take up the remaining vacuum.

While certain specific embodiments of the invention have been described with particularity herein, it should be recognized that various modifications thereof will occur to those skilled in the art. Therefore, the scope of the invention is to be limited solely by the scope of the appended claims.

We claim:

1. A method for producing a collapse resistant, molecularly oriented, heat set polyester container for use in hot fill applications, said method comprising the steps of:
   (a) forming in a mold cavity a molecularly oriented polyester container having at least one preselected region which projects inwardly into said container in a first configuration;
   (b) heating said oriented container while in contact with the cavity walls at a temperature sufficient to induce rapid crystallization of the polyester to form a heat set container, at least said region being heated to a temperature and for a time sufficient to produce from about 28% to about 32% crystallinity in said region;
   (c) reshaping said region outwardly to a second configuration at a temperature from just above the hot fill product temperature up to the heating temperature of step (b); and
   (d) cooling the resulting container while maintaining said region in said second configuration to provide a thermoelastically deformable region which tends to return to said first configuration after hot filling and sealing said resulting container to at least partially relieve pressure forces which tend to collapse said container after hot filling and sealing.

2. A method for producing a collapse resistant, molecularly oriented, heat set polyester container for use in hot fill applications, said method comprising the steps of
   (a) distending a substantially amorphous polyester preform at a temperature within the molecular orientation temperature range of said polyester in a mold to form an oriented container having sidewalls and a base, said base being formed in a first configuration which projects inwardly into said container;
   (b) heating said oriented container in and while in contact with walls of said mold, at a temperature sufficient to induce rapid crystallization of said polyester to form a heat set container, at least the inwardly projecting base being heated to a temperature and for a time sufficient to produce from about 28% to about 32% crystallinity in said base;
   (c) reshaping said base outwardly to a second configuration at a temperature from just above the hot fill product temperature up to the heating temperature of step (b); and
   (d) cooling the resulting container while maintaining said base in said second configuration to provide a thermoelastically deformable base which tends to return to said first configuration after hot filling and sealing said resulting container to at least partially relieve pressure forces which tend to collapse said container after hot filling and sealing.

3. A method for producing a collapse resistant, oriented heat set polyester container for use in hot fill applications, said method comprising the steps of:
   (a) distending a substantially amorphous polyester preform at a temperature in the molecular orientation temperature range of said polyester in a mold to form an oriented container having sidewalls and a base, said base being formed in a first configuration which projects inwardly into said container;
   (b) differentially heating said oriented container in and while in contact with walls of said mold, said differential heating comprising heating said sidewalls at a temperature and for a time sufficient to produce at least about 35% crystallinity in said sidewalls, and heating said base at a temperature and for a time sufficient to produce from about 28% to about 32% crystallinity in said base;

(c) reshaping said base outwardly to a second configuration at a temperature from just above the hot fill product temperature up to the base heating temperature of step (b); and (d) cooling the resulting container while maintaining said base in said second configuration to provide a thermoelastically deformable base which tends to return to said first configuration after hot filling and sealing said resulting container to at least partially relieve pressure forces which tend to collapse said container after hot filling and sealing.

4. The method of claim 1 wherein said preselected region is the base of said container.

5. The method of claims 1, 2 or 3 wherein said polyester is polyethylene terephthalate.

6. The method of claims 2 or 3 wherein said preform is made by injection molding.

7. The method of claims 2 or 3 wherein said preform is distended at a temperature of from about 20° F. to about 65° F. above the glass transition temperature of said polyester.

8. The method of claim 2 or 3 wherein said preform is distended at a temperature of from about 195° F. to about 205° F.

9. The method of claim 1, 2 or 3 wherein said oriented container is formed by a stretch/blowing process.

10. The method of claims 1, 2 or 3 wherein the oriented container has a combined stretch of from about 150% to about 475%.

11. The method of claims 2, 3 or 4 wherein said base is heated to a temperature of from about 240° F. to about 270° F.

12. The method of claim 3 wherein said sidewalls are heated to a temperature of from about 300° F. to about 400° F.

13. The method of claims 1, 2 or 3 wherein said heating of said oriented container is carried out for a time of up to about 10 seconds.

14. The method of claims 1, 2 or 3 wherein said reshaping and said cooling are effected in a mold with an inner surface corresponding to said second configuration.

15. The method of claims 1, 2 or 3 wherein said reshaping is effected at a temperature of from about 180° F. up to about 285° F.

16. The method of claims 1, 2 or 3 wherein said container is cooled to a temperature in the range of from about 20° F. to about 150° F.

17. The method of claims 2 or 3 additionally comprising the step of molding stiffening members into said container sidewalls.

18. The method of claims 2 or 3 additionally comprising molding a plurality of stress points into said base in said second configuration to facilitate the uniform thermoelastic deformation of said base to said first configuration.

19. The method of claims 2 or 3 additionally comprising the step of molding at least one preselected, substantially planar pressure deformable region into said container sidewalls.

20. The method of claims 1, 2 or 3 wherein said container has a capacity of from about 120 to about 3780 cubic centimeters.

* * * * *